(No Model.)
P. KROPF.
METHOD OF MANUFACTURING BEER.
No. 528,374.  Patented Oct. 30, 1894.
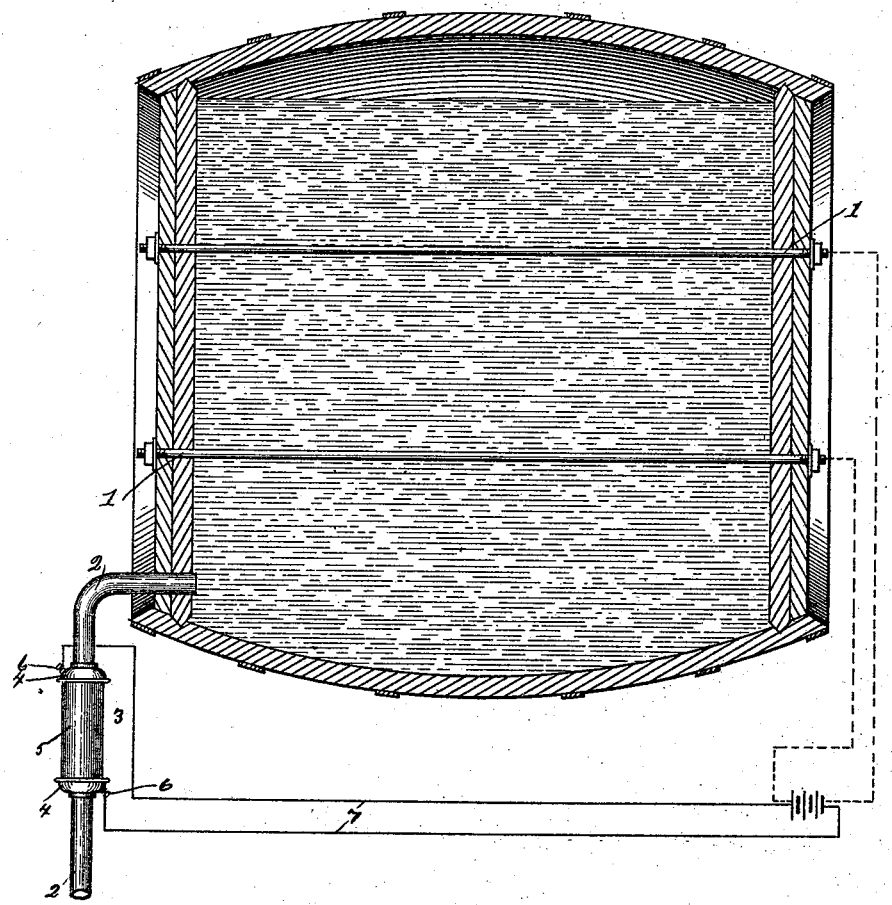
Witnesses:
Rudolph Wm. Lotz
N. R. Kennedy
Inventor:
Paul Kropf
By Harry Cobb Kennedy
Attorney.

UNITED STATES PATENT OFFICE.

PAUL KROPF, OF CHICAGO, ILLINOIS, ASSIGNOR OF ONE-HALF TO AUGUST GRUELL, OF SAME PLACE.

METHOD OF MANUFACTURING BEER.

SPECIFICATION forming part of Letters Patent No. 528,374, dated October 30, 1894.

Application filed May 26, 1894. Serial No. 512,555. (No specimens.)

*To all whom it may concern:*

Be it known that I, PAUL KROPF, a citizen of the United States, residing at Chicago, in the county of Cook and State of Illinois, have invented certain new and useful Improvements in Methods of and Apparatus for Manufacturing Beer; and I do hereby declare the following to be a full, clear, and exact description of the invention, such as will enable others skilled in the art to which it appertains to make and use the same.

This invention relates to a novel method for manufacturing beer, the object being to provide a method whereby the time and expense required for the manufacturing of beer can be reduced.

The invention consists in the novel method herinafter fully described and specifically claimed.

The accompanying drawing is a central longitudinal section of a hogshead or cask showing one way in which my method can be carried out.

In the manufacture of beer there are two stages in which fermentation takes place, called the "first fermentation," and the "after fermentation." In the after fermentation, which takes place in the storage casks, and requires from six to ten weeks, the slow fermentation of the remaining sugar occurs, as well as the precipitation of albumenites and yeast cells, preparatory to the treatment of the unfinished beer in the chips casks. My invention relates to this after fermentation and is designed to accomplish in a few hours that which formerly required six to ten weeks. To accomplish this I subject the partially fermented beer to a current of electricity which has the effect of precipitating the albumenites and yeast cells, and fermenting the remaining portion of the sugar, after which the beer is conveyed to the chips casks. When subjecting the partially fermented beer to the action of an electric current, it is kept at a low temperature, for instance at about 32° Fahrenheit, as in the storage casks.

I set forth the above as the best deductions I am at present able to give after carrying out this method in a practical manner, but I am not able to state positively that these deductions are in every way correct, as they are the best results of the observation of the method as carried out. I am, however, able to state positively that by subjecting the partially fermented beer to the action of an electric current and at the temperature stated, I accomplish the after fermentation in a short time as stated and so age and purify it that it is equal in quality to beer that has remained the usual time in the storage casks. The current of electricity, of one hundred to one hundred and ten volts for instance, can be obtained from a dynamo, although the voltage can be varied as found desirable according to the beer to be produced, and in some instances I have subjected the beer to a current of fifteen minutes' duration and obtained satisfactory results, but such matters as the strength and duration of the current will vary according to the best judgment of the brewer in view of the article to be treated and produced and a fixed rule cannot be given. I contemplate passing the current of electricity through the unfinished beer while it is in a cask, or while it is passing through a pipe, as found most convenient.

In the accompanying drawing I have shown a hogshead or cask and have illustrated two ways in which the current can be applied to the beer. These hogsheads usually have strengthening rods 1, extending between the heads of the same and by attaching the poles of the dynamo to two of these rods a current of electricity can be passed through the beer while it is in the hogshead, or if convenient, the current can be applied during the passing of the beer to the drawing-off room, and I have shown in the drawing a pipe 2, provided with a non-conducting section 3, which conveniently consists of two vulcanized rubber caps 4 and an interposed glass tube 5. The said caps 4 are provided with metallic plugs 6, to which the wires 7 leading from a dynamo can be attached. In this way it will be seen that the beer when passing through this non-conducting section 3 of the pipe 2 will be subjected to the electric current passing between the metallic plugs 6. Various other arrangements and constructions can be employed for carrying out this method, as will be obvious.

I claim as my invention—

1. The herein described method for manufacturing beer which consists in subjecting the liquor to the first fermentation, and then passing a current of electricity through the partially fermented beer, substantially as described.

2. The herein described method for manufacturing beer, which consists in subjecting the liquor to the first fermentation, and then passing a current of electricity through the partially fermented beer, and at the same time keeping the partially fermented beer at a low temperature, substantially as described.

In testimony whereof I affix my signature in presence of two witnesses.

PAUL KROPF.

Witnesses:
   RUDOLPH WM. LOTZ,
   HARRY COBB KENNEDY.